United States Patent Office 3,348,114
Patented Oct. 17, 1967

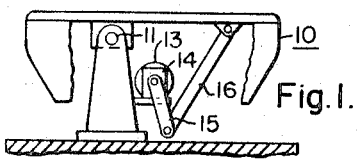
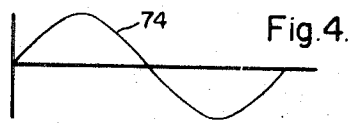
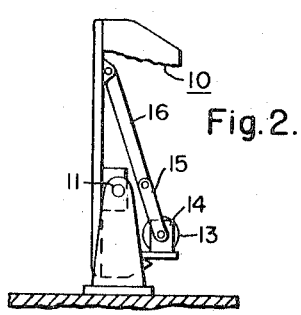
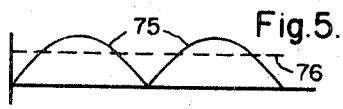
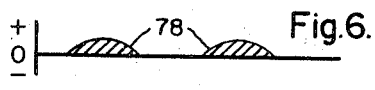
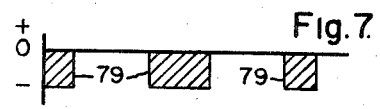
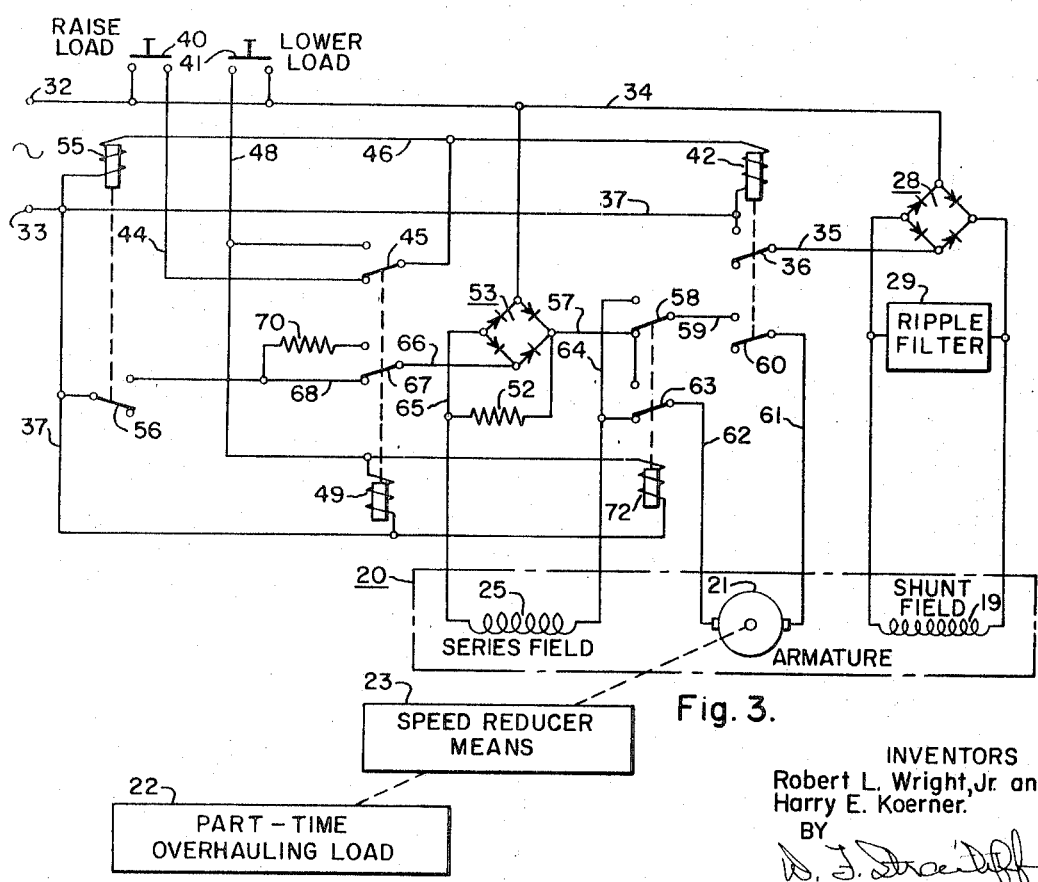

3,348,114
MOTOR DRIVE APPARATUS WITH DYNAMIC BRAKING
Robert L. Wright, Jr., N. Linthicum, and Harry E. Koerner, Catonsville, Md., assignors to Westinghouse Electric Corporation, East Pittsburgh, Pa., a corporation of Pennsylvania
Filed May 11, 1964, Ser. No. 366,538
4 Claims. (Cl. 318—369)

ABSTRACT OF THE DISCLOSURE

A motor drive apparatus which employs a direct current motor having a shunt field available of direct current at a nonreversible polarity from an alternating current line source by way of rectifier means, and a armature in mechanical connection to the load, which, during actuation of the load, is concurrently connected electrically to both a dynamic brake resistance means as well as a full wave bridge rectifier connected to the alternating current line source, such that the armature receives pulsating direct current from the rectifier means where the load requires power drive and the armature creates a preponderant current passed through the brake resistance means when the load becomes overhauling and turns the armature.

---

In actuating a load by a motor drive system, such as tilting an X-ray table, such load may become overhauling to the motor drive at times and in variable degree during movement of the load, such as during lowering of an X-ray table from a vertical position following powered initiation of such lowering movement. The problem of effecting actuation of a part-time-overhauling load by a motor drive system, therefore, often involves both driving and braking for satisfactory performance, and for this dual purpose a direct current motor is often employed to serve part-time duty as a generator providing dynamic braking. It becomes necessary, therefore, in such direct curent motor drive system to provide for conversion to dynamic braking where the load requires restraint rather than driving effort. In cases, such as in the chosen example, where movement of the load even in a given direction can involve both part-time power drive as well as part-time braking, conventional direct current motor drive systems have found limited use, due in part to lack of available direct current power sources and in part to lack of a practical means for controlling the relatively complex power-to-braking conversion requirements.

In view of the foregoing remarks, it becomes an object of the present invention to provide a direct current motor drive system for a part-time-overhauling load, which is operable from an alternating current line and embodies simplified means for effecting the conversion from motor operation to generator operation.

It is usually desirable to actuate the load in opposite directions, one of which directions may not entail the existence of any overhauling condition of the load, and accordingly it becomes another object of the present invention to provide a direct current motor drive system embodying the above general feature adapted for bidirectional actuation of a load which is overhauling in only one direction of its actuation, which system embodies a means for altering the effectiveness of the direct current pulses presented to the motor armature, according to the direction of its rotation, to reduce the amplitude of the direct current pulses supplied to the armature while the load in moving in the direction in which it becomes overhauling and dynamic braking becomes effective.

Other objects, features, and advantages of the invention will become apparent from the folowing detailed description when taken in connection with the accompanying drawing, in which:

FIGS. 1 and 2, are view of a motor driven load in form of an X-ray table, shown in different attitudes to which it may be actuated according direction of motor drive rotation and in one of direction of which actuation the load becomes overhauling in varying degree in accord with characteristics of the mechanical linkage between such motor drive and the load;

FIG. 3 is a circuit diagram of control means embodied in the novel motor drive apparatus of the present invention; and FIGS. 4 through 7 are voltage and current diagrams explanatory of operating characteristics of the circuit of FIG. 2.

Referring to FIGS. 1 and 2, a typical load with which the novel direct current motor drive system of the present invention can be employed to advantage might be such as an X-ray table 10 actuable about a fixed pivot axis 11 from a horizontal attitude in which it is shown in FIG. 1 to a vertical tilted attitude in which it is shown in FIG. 2 by operation of a motor 13 and speed reducer 14 assemblage through the medium of such as a crank lever 15 and connecting rod 16 linkage. During raising of the table 10, the motor 13 will operate in one direction and the load will be hauling all the way to vertical attitude of such table. During lowering of the table 10, the table in its vertical attitude may not be exerting any torque on the output shaft of the motor 13, due to the efficiency of the speed reducer 14, the kinematics of the table support and lift linkage, top dead center position of crank lever 15 and rod 16, for example, or a combination of these and other factors, so that initiation of such lowering of the table must be effected by drive from the motor, after which continued lowering may ensue under progressive influence of gravity and the motor load becomes overhauling progressively until the horizontal attitude is again reached. The types of table tilting arrangements having such one-way-variable-overhauling load characteristics are many and varied, the arrangement shown in FIGS. 1 and 2 is by way of simplified illustration and should not be taken in a limiting sense as to utilization of the direct current motor drive system of this invention.

Referring to FIG. 3, the novel drive system of the present invention comprises a direct current motor 20 which essentially includes a shunt field 19 and an armature 21 for mechanical connection to a part-time overhauling load 22, which may be an X-ray table such as exemplified in FIGS. 1 and 2, by way of speed reducer means 23 where required. Motor 20 unessentially may be a compound motor as exemplified herein, and include a series field 25; a compound motor and a shunt motor both being suitable to the invention, but the former being preferred in the basis of commercial availability and cost.

In accord with features of the invention, the shunt field 19 of the motor 20 is constantly availed of direct current of non-reversing polarity at all times during operation of the system from a full wave rectifier means 28 the direct current pulsed output of which is smoothed by ripple filter means 29, and the alternating current input of which is availed from alternating current line terminals 32 and 33 by way of an A.C. feed circuit including an A.C. line conductor 34 constantly connected to A.C. terminal 32 and a path to the other terminal 33 which includes a conductor 35, a normally-open relay switch 36 which is closed at all times during operation of the system, and an A.C. line conductor 37, such closure of relay switch 36 occurring as a result of closure of either one of "Raise Load" or "Lower Load" operator's push button switches 40 and 41 which results in A.C. energization of a relay coil 42 operating such switch 36. In detail, closure of switch 40 completes an A.C. energizing circuit for coil 42 between conductors 34 and 37 via a conductor 44 a relay switch 45, a conductor 46 having a branch leading to one terminal of coil 42, and a branch of the conductor 37 connected to the other terminal of such coil. On the other hand, closure of switch 41 completes an A.C. energizing circuit for coil 42 between conductors 34 and 37 by way of a conductor 48 respective thereto and the switch 45 as positioned by actuation of a relay coil 49 brought into A.C. energization via a branch of such conductor 48 connected to one terminal branch of such conductor 48 connected to one terminal of such coil and a branch of A.C. line conductor 37.

The armature 21 is concurrently connected to both a dynamic brake resistance means 52 as well as to the pulsating direct current output of a full wave rectifier means 53 while its input is connected to the A.C. line conductors 34 and 37 during operation of the system with either of the operator's push button direction switches 40 and 41, held depressed, either one of which effects establishment of connection of the input of rectifier means 53 to the A.C. line conductors 34 and 37, and their selective operation effects reversal of polarity between the output of such rectifier means and the terminals of the motor armature 21 to reverse the direction of its rotation, hence reverse the direction of load actuation, such as per chosen exemplification, depression of push button switch 40 for effecting armature turning to raise the load and depression of push button switch 41 to lower the load.

In operation, depression and holding-in of push button switch 40, in addition to effectuating D.C. energization of shunt field 19 as aforedescribed, in connecting the conductor 46 to the A.C. line conductor 34 via the relay switch 45, establishes an A.C. circuit through a relay coil 55 to close a relay switch 56 to complete an energizing circuit through the motor armature 21 to cause same to operate in a direction for actuating the load in its non-overhauling direction, such as for raising an X-ray table about a tilt axis as in FIGS. 1 and 2. This energizing circuit can be traced from A.C. line conductor 34 and a branch thereof, through full wave rectifier 53, thence, as full wave pulsating direct current through a conductor 57, a relay switch 58, a conductor 59, a relay switch 60 picked up by coil 42 in conjunction with switch 36 as aforedescribed for energizing shunt field 19, through a conductor 61, the motor armature 21, a conductor 62, a relay switch 63, a conductor 64, series field 25 of the motor, a conductor 65, the rectifier bridge 53, thence as A.C., through a conductor 66, a relay switch 67, a conductor 68 and the relay switch 56 to the other A.C. line conductor 37. So long as switch 40 is held depressed the load, such as X-ray table 10, will be actuated in its hauled direction up to its limit of travel, such as the vertical position of X-ray table 10 shown in FIG. 2. During such time that the motor 20 is driving the hauling load, due to inertia of the armature and load system, during the zero-approaching part of each half-wave D.C. pulse supplied to the motor armature 21, such armature will develop a preponderant voltage and cause a slight amount of current to pass through the braking resistor 52, and this represents a slight loss in power output from the motor which is tolerated in the system in order to obtain instantly and automatically-available dynamic braking action as hereinafter described.

Upon release of switch 40, energizing circuits for both the shunt field 19 and the motor-armature 21 are disrupted by virtue of disruption of the energizing circuits for relay coils 42 and 55 in which switch 40 had been included.

To lower the load, such as X-ray table 2 from its vertical attitude of FIG. 2 to its horizontal attitude of FIG. 1, the push button switch 41 is held depressed to complete an energizing circuit for relay coil 49 as previously traced, to establish the previously traced energizing circuits for relay coils 42 and 55 via switch 45 picked up by coil 49, thereby again effecting energization of the shunt field 19 of motor 20 with the same polarity as before, with relay switches 36, 60 and 56 becoming closed. At the same time, energization of relay coil 49 raises its switch 67 to an uppermost position which by-passes conductor 68 with a resistor 70 to reduce the A.C. voltage applied to rectifier means 53 which supplies the motor armature 21, since any work required to actuate the table downwardly will be less than that required to raise it, and, simultaneously with energization of relay coil 49, a parallel armature-polarity-reversing relay coil 72 becomes energized to shift the switches 58 and 63 for reversing direction of current flow from rectifier means 53 through the motor armature 21 which will be caused to rotate reversely in its load-lowering direction. As the load, X-ray table 10 in FIG. 2, for example, leaves its vertically-tilted position by actuation from the motor, it may tend to present a progressively overhauling, or otherwise variably overhauling load, to the motor. In accord with a prime feature of the present invention, such overhauling load increasingly tends to drive the motor armature 21 and develop a pure direct current output voltage proportionate to the torque applied by the load thereto. The motor thus becomes progressively or variably transformed into a D.C. generator and its output voltage overcomes the D.C. pulses from the rectifier means 53 for portions of each pulse period to an increasing extent according to degree of such overhauling torque. During each such period of motor voltage preponderance, current, in being blocked from flow to the A.C. line conductors 34 and 37 by the rectifier means 53, will flow from the armature 21 through the dynamic braking resistor 52 via the armature energizing circuit as previously traced, while the D.C. pulse peaks preponderating over the armature-generated D.C. will tend to drive such armature. The preponderances between motor-driving current pulses and braking current pulses thus automatically varies according to the need of the system as drive and/or brake and controlled actuation of the load in a variable overhauling situation is extremely smooth.

A typical load situation involving a predominance of dynamic braking with a small degree of motor drive is illustrated diagrammatically in FIGS. 4 through 7. One cycle of the A.C. voltage wave 74 of line conductors 34 and 37 is shown in FIG. 4. Direct current voltage pulses 75 presented to the motor armature 21 by the rectifier means 53 is compared to the pure direct current voltage output 76 from the armature 21 as a result of being driven by a degree of overhauling load. The shaded positive fractional, half-cycle sine wave tip areas 78 in FIG. 6 show current from the rectifier 53 tending to drive the armature 21, and the shaded, rectangular, negative areas 79 in FIG. 7 indicate armature current passed through resistance 52 as dynamic braking restraint on rotation of the armature by the overhauling load.

Upon releasing push button switch 41, the motor drive system is de-activated, and all components of the circuit of FIG. 3 return to the positions in which they are shown therein.

From the foregoing it will be apparent that the invention provides an improved direct current motor drive system for actuation of loads which become overhauling during an operating cycle.

While there has been shown and described an illustrative embodiment of the invention, modifications thereto may readily occur to those versed in the art. It is not desired, therefore, that the invention necessarily be limited to the specific arrangement, shown and described, and it is intended to cover in the appended claims all such modifications as fall within the true spirit and scope of the invention.

Having thus described our invention, we claim:

1. A drive system comprising alternating current line conductors; a direct current motor having an armature in mechanical torque-coupled connection to a part-time overhauling load and having a shunt field; means supplying energizing direct current to said shunt field during operation of the system including at times both load actuation and load braking; full-wave bridge rectifier means having input terminals and output terminals; and circuit means connecting the rectifier input terminals to said alternating current line conductors, and connecting said armature and said dynamic braking current absorbing means simultaneously across the rectifier output terminals, during both load actuation and load braking.

2. The drive system as set forth in claim 1, further comprising switching means for reversing connection of the motor armature with respect to the rectifier output terminals while the direction of energizing current flow through the motor shunt field remains the same.

3. The drive system as set forth in claim 1, further comprising means for reducing pulsating direct current output from the rectifier means when the armature is turning in a direction involving being driven by an overhauling load.

4. The drive system as set forth in claim 1, wherein the means for supplying direct current to the motor shunt field includes a first full wave rectifier supplied by said alternating current line conductors and filter means to smooth the output therefrom.

References Cited

UNITED STATES PATENTS

| 2,666,176 | 1/1954 | Fath | 318—367 |
| 2,962,646 | 11/1960 | Pell | 318—258 |

FOREIGN PATENTS

| 518,125 | 2/1940 | Great Britain. |

ORIS L. RADER, *Primary Examiner.*

J. J. BAKER, *Assistant Examiner.*